US012705432B2

(12) United States Patent
Davish et al.

(10) Patent No.: US 12,705,432 B2
(45) Date of Patent: Aug. 11, 2026

(54) NATURAL LANGUAGE GOAL DETERMINATION

(71) Applicant: Yext, Inc., New York, NY (US)

(72) Inventors: Maxwell Davish, Brooklyn, NY (US); Yen Thai Truong, Aldie, VA (US); Nikolas Bramblett, Arlington, VA (US); Maxwell Shaw, Arlington, VA (US)

(73) Assignee: Yext, Inc., New York, NY (US)

( * ) Notice: Subject to any disclaimer, the term of this patent is extended or adjusted under 35 U.S.C. 154(b) by 295 days.

(21) Appl. No.: 18/343,498

(22) Filed: Jun. 28, 2023

(65) Prior Publication Data

US 2025/0005297 A1 Jan. 2, 2025

(51) Int. Cl.

*G06F 40/40* (2020.01)
*G06F 16/2457* (2019.01)
*G06F 16/3329* (2025.01)
*G06F 40/35* (2020.01)
*G06N 20/00* (2019.01)
*G10L 15/22* (2006.01)
*H04L 51/02* (2022.01)

(52) U.S. Cl.

CPC .......... *G06F 40/40* (2020.01); *G06F 16/2457* (2019.01); *G06F 16/3329* (2019.01); *G06F 40/35* (2020.01); *H04L 51/02* (2013.01); *G06N 20/00* (2019.01); *G10L 15/22* (2013.01)

(58) Field of Classification Search

None

See application file for complete search history.

(56) References Cited

U.S. PATENT DOCUMENTS 12,567,405 B1 * 3/2026 Kumar ................ G10L 15/1815
2018/0025085 A1 * 1/2018 Sarangi ............... G06F 16/9535 707/722

(Continued)

FOREIGN PATENT DOCUMENTS

CN 116244416 A 6/2023

OTHER PUBLICATIONS

International Preliminary Report on Patentability including International Search Report and Written Opinion of the International Searching Authority in corresponding International Application No. PCT/US2024/035762 mailed Jan. 8, 2026 (20 pages).

*Primary Examiner* — Richa Sonifrank

(74) *Attorney, Agent, or Firm* — Jeffri A. Kaminski; Venable LLP

(57) ABSTRACT

A method for a chat bot includes receiving multiple instruction sets corresponding to multiple goals, each instruction set defining a prompt to a large language model (LLM) to achieve a corresponding goal. The method further includes receiving a chat history from a user, comprising multiple messages, each message being one of a user-authored message or a chat bot-authored message, and further comprising metadata associated with said chat history. The method further includes identifying a particular goal of said user from the multiple goals, selecting a particular instruction set corresponding to said particular goal, and defining a particular prompt to the LLM. The method further includes executing said particular instruction set by providing said particular prompt to said LLM and providing a reply to said user with a result of executing said particular instruction set.

26 Claims, 21 Drawing Sheets

(56) References Cited

U.S. PATENT DOCUMENTS

| | | | | |
|---|---|---|---|---|
| 2018/0261203 | A1* | 9/2018 | Zoller | G06N 20/00 |
| 2020/0410506 | A1* | 12/2020 | Jones | G06N 20/10 |
| 2021/0303636 | A1* | 9/2021 | Dua | G06F 16/9038 |
| 2022/0058347 | A1* | 2/2022 | Singaraju | H04L 51/02 |
| 2022/0103510 | A1* | 3/2022 | Clarke | H04L 51/214 |
| 2022/0124385 | A1* | 4/2022 | Cuomo | H04N 21/4781 |
| 2022/0405687 | A1* | 12/2022 | Matsuoka | G06Q 10/063112 |
| 2023/0325442 | A1* | 10/2023 | Hennig | G06F 16/90332<br>704/9 |
| 2024/0143932 | A1* | 5/2024 | Pandita | G06F 40/216 |
| 2024/0202458 | A1* | 6/2024 | Zha | G06F 40/279 |
| 2024/0202466 | A1* | 6/2024 | Zha | G06N 5/04 |
| 2024/0205174 | A1* | 6/2024 | Bailey | G06F 40/30 |
| 2024/0394771 | A1* | 11/2024 | Archak | G06Q 30/08 |
| 2024/0404514 | A1* | 12/2024 | Rollwage | G16H 50/20 |
| 2024/0419246 | A1* | 12/2024 | Ullrich | G10L 13/08 |
| 2024/0427808 | A1* | 12/2024 | Gudla | G06F 16/3344 |
| 2024/0428007 | A1* | 12/2024 | Abdi | G06F 21/50 |

* cited by examiner

Figure 4:
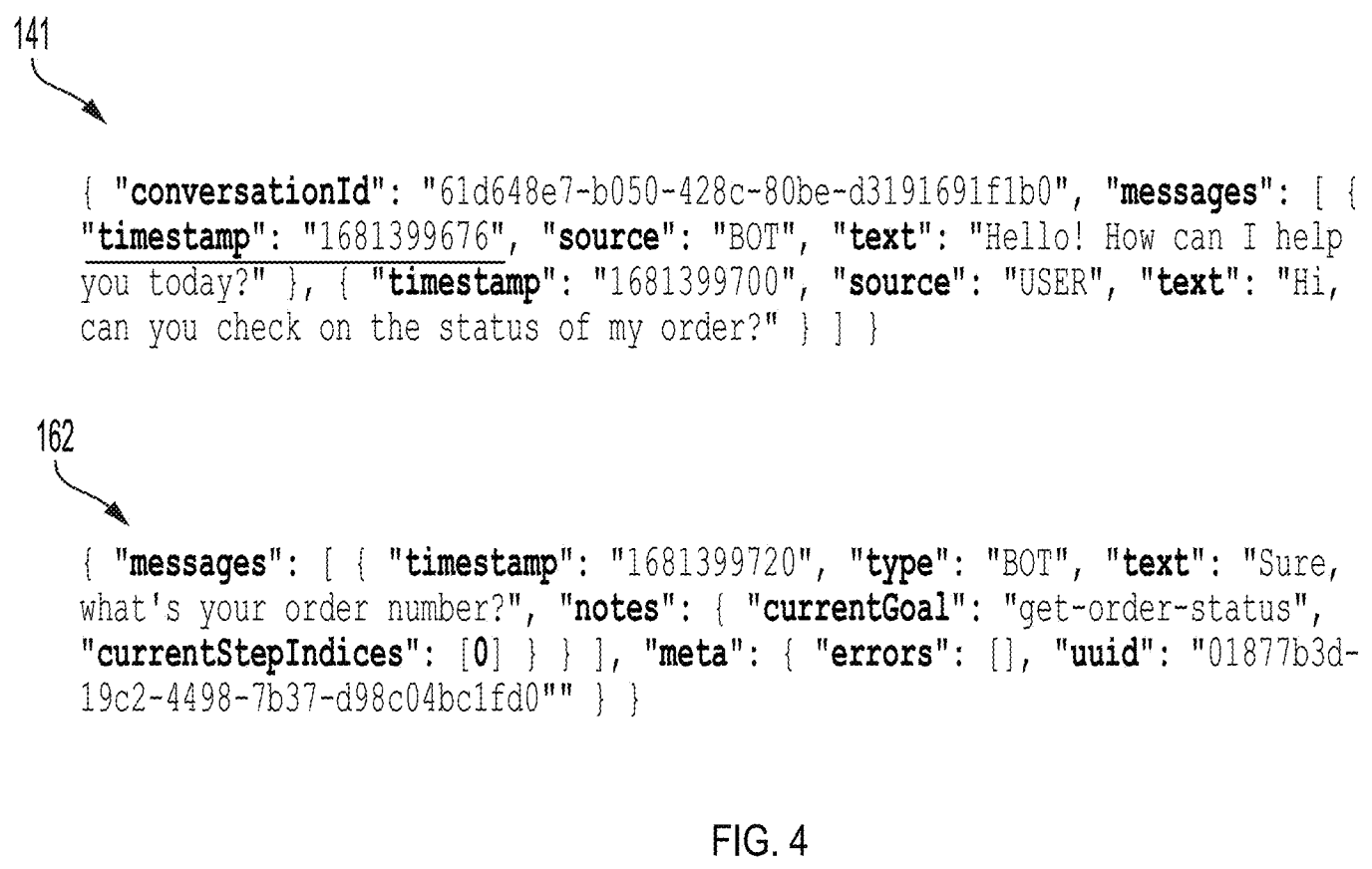

141

{ "conversationId": "61d648e7-b050-428c-80be-d3191691f1b0", "messages": [ { "timestamp": "1681399676", "source": "BOT", "text": "Hello! How can I help you today?" }, { "timestamp": "1681399700", "source": "USER", "text": "Hi, can you check on the status of my order?" } ] }

162

{ "messages": [ { "timestamp": "1681399720", "type": "BOT", "text": "Sure, what's your order number?", "notes": { "currentGoal": "get-order-status", "currentStepIndices": [0] } } ], "meta": { "errors": [], "uuid": "01877b3d-19c2-4498-7b37-d98c04bc1fd0"" } }

{ "messages": [ { "type": "DEBUG", "timestamp": 1681399700, "info": "Identified goal: 'answer-question'." }, { "timestamp": 1681399702, "type": "DEBUG", "info": "Performing Step 1: 'Search Yext for Information'" }, { "timestamp": 1681399705, "type": "DEBUG", "info": "Searching Yext for 'Blue Water Bottle price' in 'products'." }, { "timestamp": 1681399706, "type": "DEBUG", "info": "Found 1 result for 'Blue Water Bottle price'." }, { "timestamp": 1681399709, "type": "DEBUG", "info": "Performing Step 2: 'Answer the User's Question'" }, { "timestamp": 1681399720, "type": "BOT, "text": "The price of the Blue Water Bottle asked about is $14.99.", "notes": { "searchResults": {...}, "currentGoal": "answer-question", "stepsCompleted": [] } } ], "meta": { "errors": [], "uuid": "01877b3d-19c2-4498-7b37-d98c04bc1fd0"" } }

```
{ "event": "startTokenStream" } { "event" : "streamedToken", "data": {
"token" : "The" } } // The rest of the tokens { "event": "endTokenStream",
"data": { "text": "The price of the Blue Water Bottle asked about is
$14.99.", "messageId": "6c0ae45c-843f-4128-a67c-f7eb1d019d96", "timestamp":
1681399720", "notes": { "searchResults": {...}, "currentGoal": "answer-
question", "stepsCompleted": [] } } }
```

```
{
   "search": {
      "searchExperienceKey": "my-search-experience",
      "includedFields": ["title", "body", "question", "answer"]
      "includedVerticals": ["helpArticles", "faqs"]
    }
}
```

```
{
  "collect": {
    "instruction": "Ask the user for their name and email address",
    "fields": [
      {
        "id": "name",
        "type": "STRING",
        "description": "The user's first name and last name",
        "optional": false
      },
      {
        "id": "email",
        "type": "EMAIL",
        "description": "The user's email address",
        "optional": false
      }
    ]
  }
}
```

```
{
  "goal": "Get the weather in a city.",
  "examples": [
    "How's the weather like",
    "what's the weather in Brooklyn right now?",
    "what's the weather in NY?",
    "How's the weather in San Francisco?",
    "what's the weather in Los Angeles?",
    "what's the weather in San Diego?"
],
   "instructions": [
    {
     "collect": {
      "instruction": "Ask the user what city they're interested in",
      "fields": [
        {
          "fieldType": "STRING",
          "id": "city",
          "optional": false
        }
      ]
     }
    },
```

Figure 7E-1:
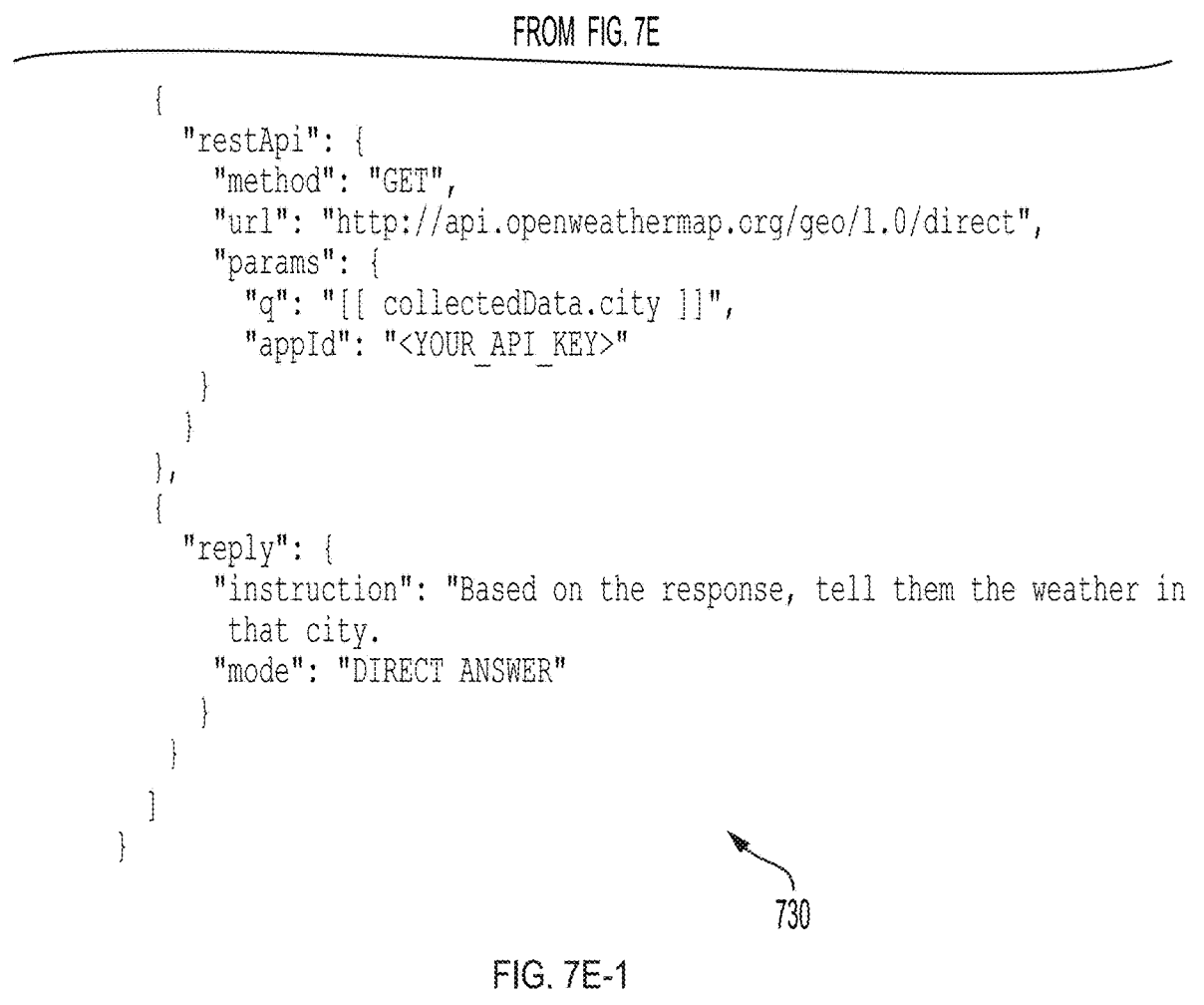

FROM FIG. 7E

```
    {
      "restApi": {
        "method": "GET",
        "url": "http://api.openweathermap.org/geo/1.0/direct",
        "params": {
          "q": "[[ collectedData.city ]]",
          "appId": "<YOUR_API_KEY>"
        }
      }
    },
    {
      "reply": {
        "instruction": "Based on the response, tell them the weather in
         that city.
        "mode": "DIRECT ANSWER"
      }
    }
  ]
}
```

```
{
  "function": {
    "pluginId": "myPlugin",
    "functionName": "myFunction"
  }
}
```

```
{
  "instructions": [
    {
      "collect": {
        "instruction": "Ask the user for their email address",
        "fields": [
            {
              "id": "email",
              "type": "EMAIL",
              "required": true,
              "description": "The user's email address"
              }
          }
        ]
    }
  },
{
  "if": {
    "condition": "If the user's email address looks like a personal
     email address (e.g. gmail.com, yahoo.com, etc.)...",
    "steps": [
      {
        "type": "COLLECT",
        "description": "Ask the user for their company name.",
        "fields": {
          "company": {
            "type": "STRING",
            "description": "The user's company name",
            "required": true
          }
        }
      }
    ]
  }
},
```

FROM FIG. 7G

```
    {
      reply": {
        "instruction": "Thank the user and tell them we'll be in touch.",
        "mode": "CONVERSATIONAL"
      }
    }
  ]
}
```

FIG. 7G-1

```
{
  "instructions": [
    {
      "collect": {
        "instruction": "Ask the user for their email address",
        "fields": [
          {
            "id": "email",
            "type": "EMAIL",
            "required": true,
            "description": "The user's email address"
          }
        ]
      }
    },
    {
      "if": {
        "condition": "If the user's email address looks like a personal
        email address (e.g. gmail.com
        "steps": [
         {
           "collect": {
           "instruction": "Ask the user for their company name",
           "fields": [
             {
               "id": "company",
               "type": "STRING",
               "required": true,
               "description": "The user's company name"
             }
           ]
          }
         },
```

FROM FIG. 7H

```
        {
          "if": {
            "condition": "If the company name indicates a tech company...",
            "steps": [
              {
                "collect": {
                  "instruction": "Ask the user for their role in the
                   company",
                  "fields": [
                    {
                      "id": "role",
                      "type": "STRING",
                      "required": true,
                      "description": "The user's role in the company"
                    }
                  ]
                }
              }
            ]
          }
        }
      ]
    }
  },
  {
    "reply": {
      "instruction": "Thank the user and tell them we'll be in touch",
      "mode": "CONVERSATIONAL"
    }
  }
 ]
}
```

```
{
  "goal": "Get a quote for insurance",
  "instructions": [
   {
     "collect": {
       "instruction": "Ask the user what type of insurance they're
        looking for",
       "fields": [
         {
           "id": "insuranceType",
           "type": "ENUM",
           "enumvalues": [
             {
               "value": "Auto",
               "description": "Auto Insurance"
             },
             {
               "value": "Life",
               "description": "Life Insurance"
             },
             {
               "value": "Home",
               "description": "Home Insurance"
             }
           ],
           "required": true,
           "description": "The type of insurance the user is
            interested in"
         }
       ]
     }
   },
   {
     "if": {
       "condition": "If the user is looking for auto insurance...",
       "steps": [
         {
```

```
        // Steps for handling auto insurance
      },
      {
        "reply": {
          "instruction": "Thank you for your interest in our auto insurance.
           We'll be in touch soon.",
          "mode": "CONVERSATIONAL"
         }
       }
     ]
   }
},
{
  "if": {
   "condition": "if the user is looking for life insurance...",
   "steps": [
      {
        // Steps for handling life insurance
      },
      {
        "reply": {
          "instruction": "Thank you for your interest in our life insurance.
           We'll be in touch soon.",
          "mode": "CONVERSATIONAL"
         }
       }
     ]
   }
},
{
  "if": {
    "condition": "if the user is looking for home insurance...",
    "steps": [
      {
```

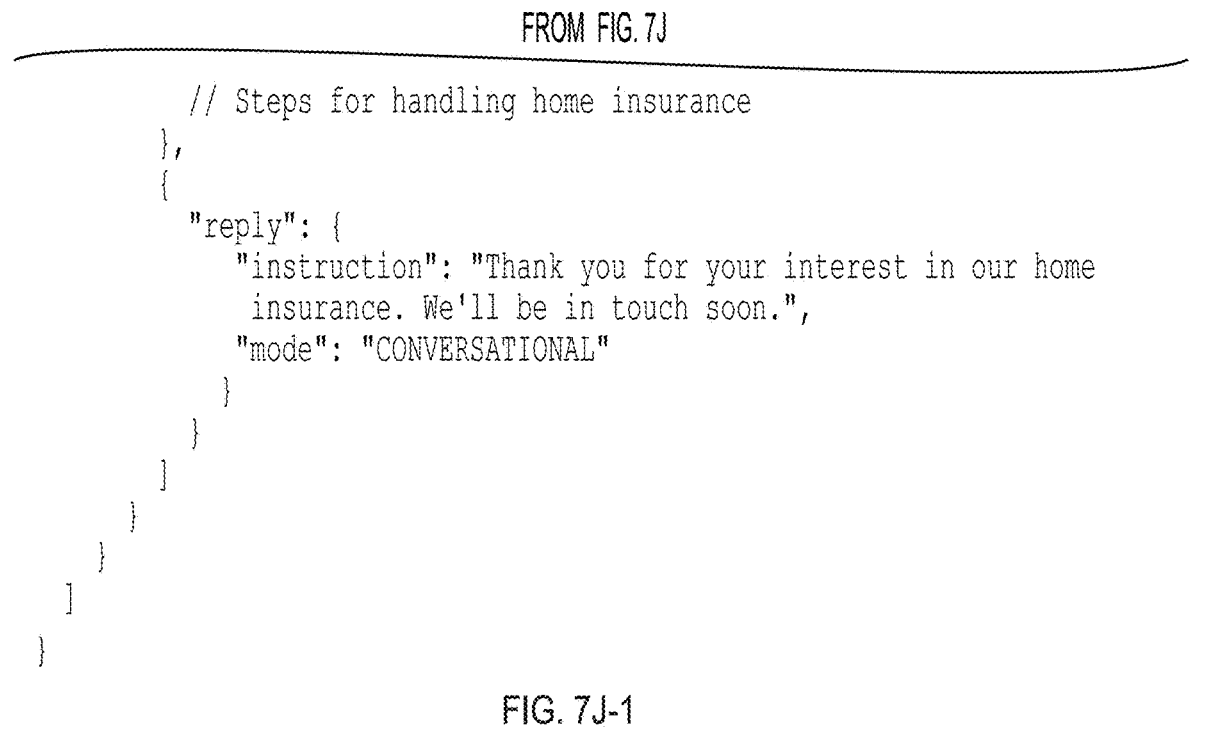

FROM FIG. 7J

```
      // Steps for handling home insurance
    },
    {
      "reply": {
        "instruction": "Thank you for your interest in our home
         insurance. We'll be in touch soon.",
        "mode": "CONVERSATIONAL"
        }
      }
    ]
   }
  }
 ]
}
```

FIG. 7J-1

NATURAL LANGUAGE GOAL DETERMINATION

BACKGROUND

1. Technical Field

Currently claimed embodiments of the invention relate to using natural language processing for user goal determination, and more specifically, artificial intelligence-powered chat assistants.

2. Discussion of Related Art

Conventional AI conversational assistants often fall short in customization and the ability to operate effectively across various platforms. They are typically restricted by their pre-programmed functions, and utilize rigid decision trees, thereby limiting their ability to cater to specific needs of users in varied domains. Furthermore, existing solutions lack a robust way of intelligently gathering user information and formulating responses based on comprehensive data analysis.

SUMMARY

According to an embodiment of the invention, a method for a chat bot includes receiving multiple instruction sets corresponding to multiple goals, each instruction set in the plurality of instruction sets defining a prompt to a large language model to achieve a corresponding goal in the plurality of goals. The method further includes receiving a chat history from a user, the chat history comprising multiple messages, each message in the multiple messages being one of a user-authored message or a chat bot-authored message, and the chat history further comprising metadata associated with the chat history. The method further includes identifying a particular goal of the user from the multiple goals, and selecting a particular instruction set from the multiple instruction sets, the particular instruction set corresponding to the particular goal and defining a particular prompt to the LLM. The method further includes executing the particular instruction set by providing the particular prompt to the LLM and providing a reply to the user with a result of executing the particular instruction set.

According to an embodiment of the invention, a non-transitory computer-readable medium stores a set of instructions for a chat bot, which when executed by a computer, configure the computer to receive multiple instruction sets corresponding to multiple goals, each instruction set in the plurality of instruction sets defining a prompt to a large language model (LLM) to achieve a corresponding goal in the plurality of goals. The instructions, when executed by the computer, further configure the computer to receive a chat history from a user, the chat history comprising multiple messages, each message in the plurality of messages being one of a user-authored message or a chat bot-authored message, and the chat history further comprising metadata associated with the chat history. The instructions, when executed by the computer, further configure the computer to identify a particular goal of the user from the plurality of goals, and select a particular instruction set from the plurality of instruction sets, the particular instruction set corresponding to the particular goal and defining a particular prompt to the LLM. The instructions, when executed by the computer, further configure the computer to execute the particular instruction set by providing the particular prompt to the LLM and provide a reply to the user with a result of executing the particular instruction set.

BRIEF DESCRIPTION OF THE DRAWINGS

Further objectives and advantages will become apparent from a consideration of the description, drawings, and examples.

FIG. 4 shows examples of a request and a response, according to some embodiments.

FIG. 5 shows an example of a debug message, according to some embodiments.

FIG. 6 shows an example of the flow of data during a server-sent event, according to some embodiments.

FIG. 7C shows an example of a search step, according to some embodiments.

FIG. 7D shows an example of a collect step, according to some embodiments.

FIG. 7E shows an end-to-end example that combines a collect, a REST API, and a reply step, according to some embodiments.

FIG. 7F shows an example of a function, according to some embodiments.

FIG. 7G shows an example of an IF step, according to some embodiments.

FIG. 7H shows an example of a nested IF step, according to some embodiments.

FIGS. 7I and 7J show an example of mutually exclusive conditional steps, according to some embodiments.

DETAILED DESCRIPTION

Figure 1A:
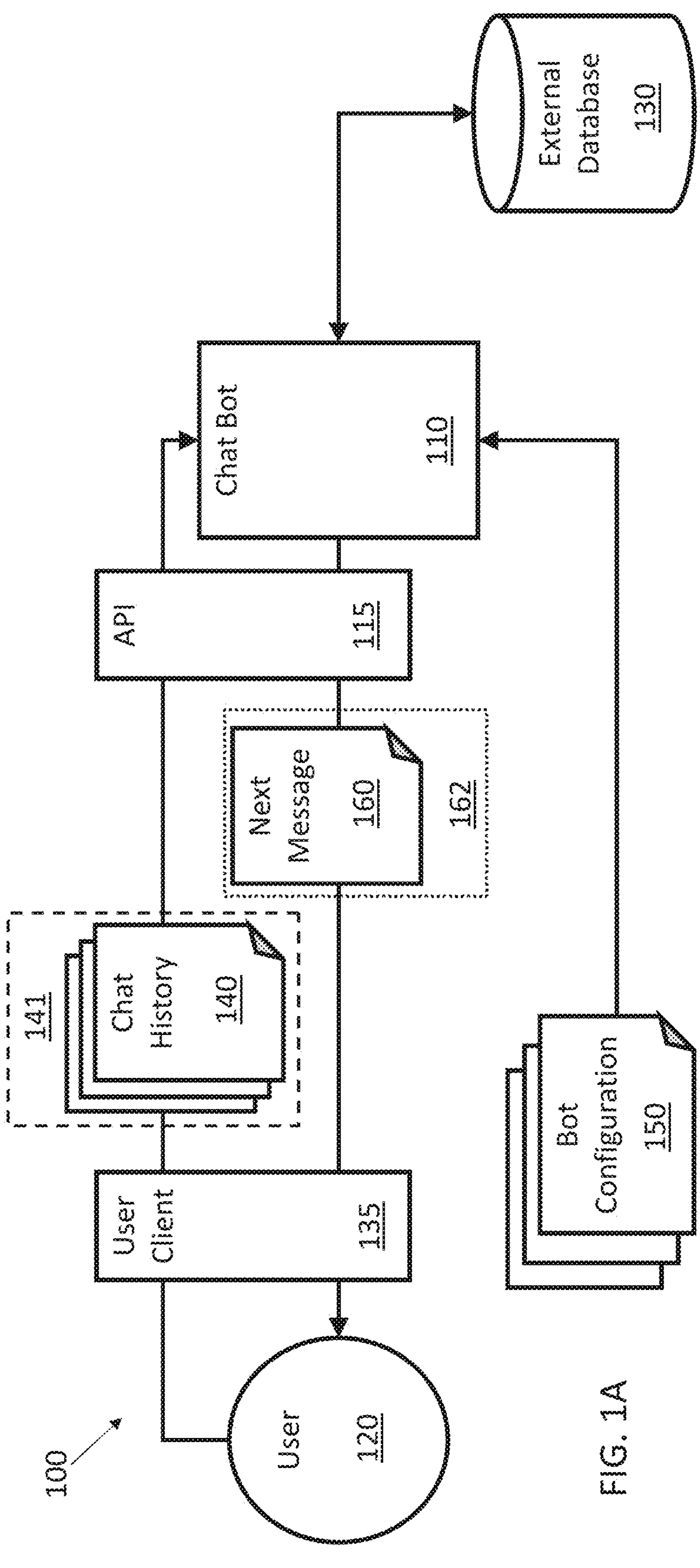
FIG. 1A conceptually shows a system, according to some embodiments.

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed, and other methods developed, without departing from the broad concepts of the current invention. All references cited anywhere in this specification, including the Background and Detailed Description sections, are incorporated by reference as if each had been individually incorporated.

The term "prompt" as used herein refers to a text input or instruction designed to guide a large language model (LLM) in generating contextually appropriate responses. The prompt may include definitions, supplemental data, and/or contextual cues, that constrain the output of the LLM and improve the coherence and relevance of the generated output to the user's requirements.

The term "large language model" or LLM as used herein refers to an artificial intelligence system that is designed to process and generate realistic human text, being trained on a large dataset of human-authored input and language data. The system may be, for example, a feed-forward convolutional neural network and the training data may be writing and texts such as webpages, wikis, databases, fiction, etc.

The term "chat bot" as used herein refers to an automated conversational agent that uses natural language processing and/or machine learning algorithms to interact with humans in a conversational manner. A chat bot simulates human-like conversations to provide information, perform tasks, and entertain the human user.

Some embodiments provide a system that employs large language models (LLMs) to interact with users using a text-based interface (e.g., a chat bot) and comprehend user intent, analyze data, and maintain the state of the conversation. Using custom goals and instructions, the system offers highly personalized and enhanced user experiences across various fields, including but not limited to marketing, support, workplace, and commerce. For example, the system detects goals in a search query and provides responses based on the goal detection.

In some embodiments, the system provides AI-powered conversational assistance in the form of a chat bot that leverages LLMs for composing responses to users. The chat bot is capable of discerning the intended goal of the user, analyzing and interpreting data from external systems, and systematically collecting and structuring data from the ongoing conversation. The system permits instructions to be defined primarily in natural language. The natural language instructions may be presented to the LLM along with other context such as the message history and metadata (e.g., notes, etc.) from previous steps, and the LLM fluidly decides what to do next. The administrator of the system may define the bot's behavior in natural language, the same way they would to a human employee.

FIG. 1A conceptually shows a system 100, according to some embodiments. The system 100 includes a chat bot 110 that interacts with a user 120. In some embodiments, the system 100 may also be in communication with an external database 130. In the example of FIG. 1A, the chat bot 110 is accessed via an application programming interface (API) 115 that processes the conversation with the user 120. In this example, the chat bot 110 is stateless, meaning that the state of the conversation between the user 120 and the chat bot 110 is maintained entirely on the client side by a user client 135. The user client 135 may be a client-side program executing within a web browser, a mobile application, or any other interface used by the user 120 to access the chat bot 110.

Figure 1C:
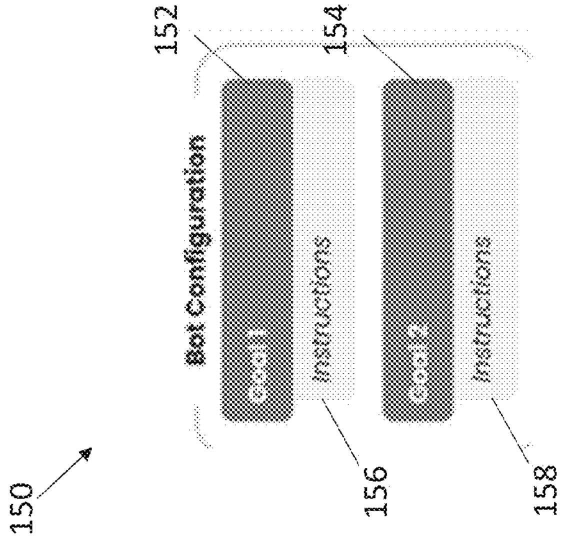
FIG. 1C shows an example of a bot configuration, according to some embodiments.
Figure 1B:
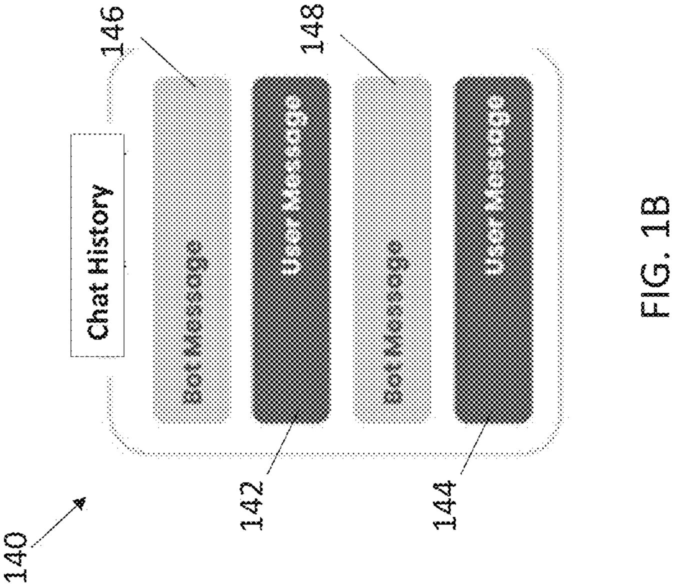
FIG. 1B shows an example of a chat history, according to some embodiments.

In each interaction between the chat bot 110 and the user 120, the user's chat history 140 is maintained and provided by the user client 135 to the chat bot 110. The chat history 140 may be provided as an array of prior chat messages from both the user 120 and the chat bot 110, representing the entire conversation state up to that point in time. The chat history may be part of a request 141 to the API 115 (shown in FIG. 1A as a dashed line enclosing the chat history 140). An example of a chat history 140 is provided in FIG. 1B, showing multiple messages, including user messages 142, 144 from the user 120 and bot messages 146, 148 from the chat bot 110.

The chat bot 110 may also be configured using a bot configuration 150. An example of a bot configuration 150 is shown in FIG. 1C, defining goals 152, 154 and instructions 156, 158 for executing those goals. Note that while only two goals 152, 154 and corresponding instructions 156, 158 are shown in the example of FIG. 1C, any number of goals and instructions may be defined in the bot configuration 150.

Goals describe something the user 120 is trying to do, like "Answer a Question," "Order Delivery," or "Schedule an Appointment". Each goal (e.g., goals 152, 154) may have a few configuration elements, including but not limited to a unique identifier, and the goal itself, which describes the goal in natural language. Each goal may also have a list of examples, which are phrases or questions that the user 120 may say to indicate that the user 120 is trying to pursue a particular goal, such as "I want to get a demo" or "How do I reset my alarm clock?"

Each instruction (e.g., instructions 156, 158) tells the chat bot 110 how to achieve the corresponding goal. For example, instructions for a goal of "answer a question using a search engine" may be, "1. Search using search engine X for information relevant to the user's question. 2. Answer the user's question based on the search results."

However, goals and instructions may be used to complete more complex tasks. For example, a health clinic might use the chat bot 110 to help patients schedule appointments, in which case the instructions for the "Schedule an Appointment" goal might be as follows:

"1. Ask the user what type of appointment they're looking for (a consultation or a follow-up) 2. If the user is looking for a follow-up: 2*a*. Ask the user who they met with originally. 2*b*. Look up that doctor's availability in the scheduling system. 2*c*. Present the user with the doctor's availability and ask them to choose a slot. 2*d*. Send the user's choice to the scheduling system. 2*e*. Reply to the user, letting them know they'll receive an email confirmation. 3. If the user is looking for a consultation: 3*a*. Ask the user what their symptoms are. 3*b*. Based on the symptoms, look up a relevant doctor. 3*c*. Look up that doctor's availability in the scheduling system. 3*d*. Present the user with the doctor's availability and ask them to choose a slot. 3*e*. Send the user's choice to the scheduling system. 3*f*. Reply to the user, letting them know they'll receive an email confirmation."

In some embodiments, these instructions involve a few different types of actions-including but not limited to collecting information from the user 120, conditional logic based on the user's choices, looking up data from external systems (e.g., external database 130), and sending data to external systems (e.g., external database 130). In some embodiments, the chat bot 110 may be configured to perform these actions using different step types. In some embodiments, each step within a goal has a type, which controls the behavior of the step. These step types are described in more detail below, and include, but are not limited to:

Reply: A reply step gives a final response to the user 120. Reply steps are unique because they terminate the goal (similar to the return keyword in most programming languages).

Collect: A collect step prompts the user 120 for information—e.g., the user's name, phone number, order number, or other type of information relevant to the user's goal-which can then be used in later downstream steps.

Search: A Search step queries a search engine for data relevant to the user's question.

REST API: Sends an HTTP request to a REST API endpoint, potentially using data from a collect step.

Function: Executes a serverless function, potentially using data from a collect step.

If: An "if" step permits use of conditional logic. It first evaluates if a condition is true and, if so, starts executing a series of nested steps.

Based on the chat history 140 and the bot configuration 150, the chat bot 110 generates an output that includes the next message 160 in the conversation and delivers the next message 160 to the user client 135. In some embodiments, the output is provided as a response 162 (shown in FIG. 1A as a dotted line enclosing the next message 160) from the API 115. Upon receiving the response, the user client 135 adds the next message 160 to the chat history 140. The next time that the user 120 asks another question or sends another message in the conversation, the user client 135 sends another API request with the updated chat history 140. In this manner, the API is completely stateless, such that the chat bot 110 has no information beyond what it receives from the user client 135 and the bot configuration 150 during each conversational interaction.

In some embodiments, the response 162 may also include metadata (equivalently referred to as "notes") that the chat bot 110 can use to understand other details about the conversation. The metadata may include, but is not limited to, the following data:

- predictedGoal: The ID of the goal the user is currently trying to perform.
- currentStepIndices: The most recent instruction step the bot performed.
- goalFirstMsgIndex: When in the conversation that goal began.
- collectedData: Any structured data collected from the user.
- queryResult: Any data retrieved from external systems such as search engines, REST APIs, or serverless functions. When the chat bot 110 interacts with another system-like a search engine, the external database 130, a serverless function, or a REST API, it saves the data in the queryResult portion of the metadata on a particular message. These are passed to step types such as "reply" (described above).

The metadata is passed to the API 115 along with the chat history 140 with each new message. The chat bot 110 uses the metadata to decide what action to perform next. The metadata is stored by the user client 135 and is passed to the API 115 with each request 141. This allows the API 115 to remain stateless, which has many benefits, such as allowing the API 115 to be globally distributed across many data centers.

When the API 115 receives a request, in some embodiments the first step is goal detection. In goal detection, the chat bot 110 looks at the chat history 140 and the list of goals (e.g., goals 152, 154) that are defined on the bot configuration 150 and attempts to predict which goal the user 120 is trying to achieve. If the metadata already defines a predictedGoal, the chat bot 110 may skip this step and continues with the goal that's already been predicted. Alternatively, in some embodiments, the chat bot 110 always performs goal detection, and if it detects the same goal as defined in predictedGoal, continues with the current goal's instructions. If the chat bot 110 detects any digression in the steps for the current goal, the chat bot 110 resets the current goal to start over. If the chat bot 110 detects a new goal, then the new goal's instructions are run, and the value of predictedGoal updated accordingly.

Goal detection, in some embodiments, involves prompting an LLM, using prompts that are constructed dynamically based on templates. This may involves interpolating aspects of the chat history 140 and the bot configuration 150 into the prompt.

Figure 2:
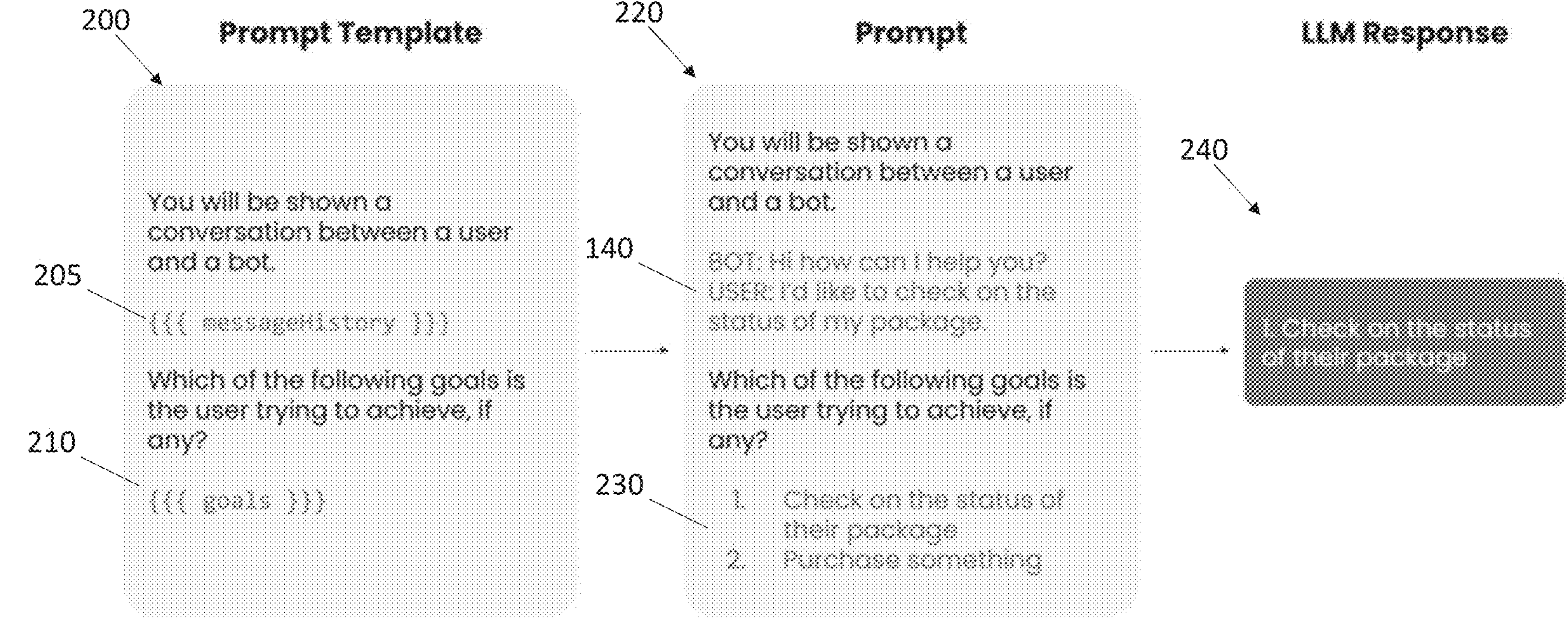
FIG. 2 shows an example of generating a prompt from a prompt template, according to some embodiments.

FIG. 2 shows an example of generating a prompt from a prompt template 200 for a predictGoal prompt. The template includes a chat history placeholder 205 and a goals placeholder 210. The prompt 220 is then generated by the chat bot 110 by filling in the placeholders with the actual chat history 140 and a list of goals 230 defined on the bot configuration 150. The prompt 220 is provided to the LLM, which returns a prediction 240 of which goal from the list of goals 230, if any, the user 120 is trying to achieve.

Figure 3:
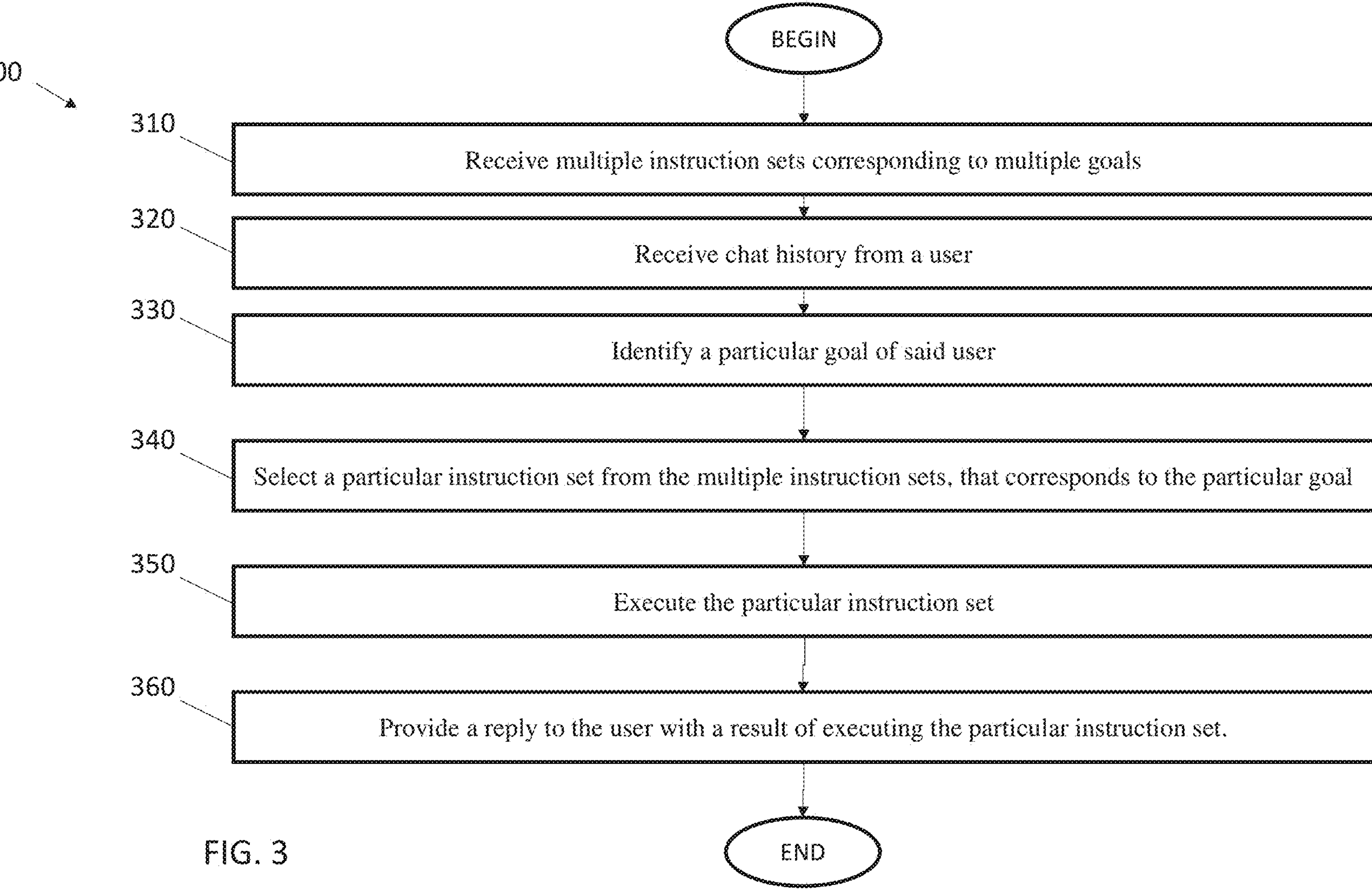
FIG. 3 shows a process of some embodiments for responding to a user query.

FIG. 3 shows a process 300 of some embodiments for responding to a user query. The process 300 may, for example, be performed by the chat bot 110 of the system 100.

The process 300 begins at 310 by receiving multiple instruction sets (e.g., instructions 156, 158) corresponding to multiple goals (e.g., goals 152, 154). In some embodiments, each instruction set defines a prompt to a large language model to achieve a corresponding goal.

At 320, the process 300 receives a chat history (e.g., chat history 140) from a user (e.g., user 120). In some embodiments, the chat history includes one or more messages, each message being either a user-authored message (e.g., user messages 142, 144) or a chat bot-authored message (e.g., bot message 146, 148), and further includes metadata associated with the chat history.

In some embodiments, the metadata includes at least one of the currently-identified goal (if any), a first index identifying a previously executed instruction in the particular instruction set, and a second index corresponding to a message in chat history.

At 330, the process 300 identifies a particular goal of the user from the multiple goals. In some embodiments, the process uses the chat history and the multiple goals to identify the particular goal.

In some embodiments, identifying the particular goal includes determining that the metadata comprises an identifier for the particular goal. In other embodiments, determining the particular goal includes: defining another prompt to a large language model the prompt including the chat history and the multiple goals, providing the other prompt to the large language model, receiving an output from the large language model, the output including the particular goal, and updating the metadata to include the particular goal.

At 340, the process 300 selects a particular instruction set from the multiple instruction sets, that corresponds to the particular goal. In some embodiments, the particular instruction set defines a particular prompt to a large language model. The particular prompt may include conditional logic to execute a subset of instructions in the particular instruction set.

In some embodiments, the particular instruction also includes one of requesting information relevant to the particular goal from the user and generating a query to an external database (e.g., external database 130) for data relevant to the particular goal.

In some embodiments, the particular prompt includes instructions for collecting information relevant to the particular goal from the user, by generating a user prompt, providing the user prompt to said user, and receiving a reply from the user in response to the user prompt, such that the reply includes the information.

In some embodiments, the particular prompt includes instructions for performing a call to an application programming interface, such that a response to the call includes the information relevant to the particular goal received from the user.

In some embodiments, the particular prompt includes instructions for performing a function call, such that the function call returns information relevant to the particular goal received from the user.

In some embodiments, the metadata is updated to include the information.

In some embodiments, the particular prompt includes instructions for generating a query to an external database for data relevant to the particular goal, providing the query to the external database, and receiving a response from the external database (e.g., external database 130), such that the response includes the data.

In some embodiments, the particular prompt includes instructions for performing a call to an application programming interface, such that a response to the call includes the data relevant to the particular goal received from the external database.

In some embodiments, the particular prompt includes instructions for performing a function call, such that the function call returns data relevant to said particular goal received from said external database.

In some embodiments, the metadata is updated to include the data.

At 350, the process 300 executes the particular instruction set by providing the particular prompt to the large language model. In some embodiments, executing the particular instruction includes selecting a particular instruction from said particular instruction set based on the first index, executing the particular instruction, and updating the first index in the metadata to identify the particular instruction.

In some embodiments, executing the particular instruction includes defining another prompt to the large language model, that includes the particular instruction and the chat history, and providing the other prompt to the large language model.

At 360, the process 300 provides a reply to the user with a result of executing the particular instruction set. The process 300 then ends.

An example of a use case for the chat bot 110 of some embodiments is to answer users' questions based on data retrieved from a search engine. Using an LLM in conjunction with a search algorithm to answer questions is also known as "retrieval augmented generation" or "in-context learning" and it is an excellent technique for question-answering from a Knowledge Graph. This approach may allow the chat bot's administrator to have full control over what data it can access.

When a search experience is linked to the chat bot 110, an "Answer Question" goal may be automatically created with two simple instructions:

1. Search the Knowledge Graph for information relevant to the user's question.
2. Answer the question based on the information found.

These steps string together three different LLM prompts. First, a Predict Search Query prompt instructs the chat bot 110 to compose a search query based on the chat history 140 of the conversation. Then, an Answer Question prompt attempts to answer the user's question based on the data retrieved by that question. A Detect Result Content prompt detects whether the answer to the user's question even exists in the retrieved results. If not, the chat bot 110 declines to answer regardless of what was returned by the "Answer Question" prompt. This is a quality control measure to help ensure that the chat bot 110 may not say anything that isn't substantiated by the data. As an example, this may only occur if the mode of the reply step is "DIRECT_ANSWER."

In some embodiments, an endpoint for a chat bot 110 may be a "/message" endpoint for an API (e.g., API 115) located at a Uniform Resource Locator.

The "/message" endpoint accepts an ordered array of messages representing the conversation history (e.g., the chat history 140) up to that point and returns the next message(s) (e.g., next message 160) in its response (e.g., response 162). As such, the chat history may be maintained on the client-side (e.g., user client 135). Examples of a request (e.g., request 141) and a response (e.g., response 162) are shown in FIG. 4.

In the examples above, message objects are passed back and forth between the user client 135 and the chat bot 110 (e.g., via the API 115). A message object may include, but is not limited to, a few properties:

Type—Each message has a type. USER messages come from an end user and BOT come from the API 115. There are also other types of messages like DEBUG, which will be shown if "?debug=True" is included in the request parameters.

Text—The text of the message, which shows up in the user interface (e.g., the user client 135).

MessageId—defines a UUID for each message. This may not be required in all scenarios, but without it, analytics and logging can become skewed. Typically UUIDs for user messages are generated on the client-side, and UUIDS for bot messages are generated on the server-side.

Timestamp—When the message was received.

Notes (metadata)—Extra information that the chat bot 110 stores to keep track of what it's already done and what the state of the conversation is.

As noted above, metadata (also referred to as "Notes") helps the chat bot 110 understand what its already done for each goal. This helps the chat bot 110 understand the aspects of the conversation state that may not be evident from the message text alone. This includes, but is not limited to:

queryResult—Data that the bot has retrieved from a search engine, or a REST API, or a serverless function.

currentGoal—The goal the chat bot 110 has detected the user is trying to achieve.

currentStepIndices-Which step within that goal's instructions the bot is currently performing. This may be an array because steps can be nested under an if step. So for example the second step within the third step would be [2,1]

collectedData—The data that the bot has collected from the user so far, structured into a JSON object.

goalFirstMsgIndex—This indicates which message the current goal began on.

In addition to messages from either the USER or the BOT, debug messages may also be received in some embodiments, for example by setting "?debug-true" in the request parameters. An example of a debug message 500 is shown in FIG. 5. In this example, it can be seen how the chat bot 110 detect the goal, initiates each step, and provides contextual information to each step.

In some embodiments, the chat bot 110 also supports streaming responses via server-sent events. For example, a streaming message endpoint may be used, located at a Uniform Resource Locator.

The streaming event may send one event per token from the response 162, as well as one event per debug message 500. FIG. 6 shows an example of the flow of data 600 during a server-sent event. In this example, the startTokenStream event tells the client that it's going to start streaming tokens, and each subsequent token is sent as a streamedToken event. The endTokenStream event tells the client that it's finished streaming tokens, and it returns all the message metadata such as the notes (metadata), messageId, and timestamp.

As noted above, each of a chat bot's goals has a series of instructions, and each instruction can be one of several types. Examples of these types are now shown, as JSON configurations that are used in some embodiments.

In some embodiments, a reply step will initiate a response to the user 120 and also signal to the chat bot 110 that the instructions are complete, similar to the return keyword in programming. Typically, a reply step is the last step in the instructions. A reply step can be used for answering a user's question, sending data back to a user, confirming that the user's order has been fulfilled, etc.

In some embodiments, at least the following behaviors may be configured in a reply step:

Mode—controls how strictly the chat bot 110 must adhere to the instructions/search results when responding to the user 120.

Citation Example—controls how the chat bot 110 should construct citations for its answers based on the search results it found.

In some embodiments, there are several different modes a reply step can use:

DIRECT_ANSWER—This mode ensures that the chat bot 110 replies only based on the data found from a search engine or another external source (i.e. the queryResult that is stored on each message). This mode may have strict quality controls that ensure that the chat bot 110 does not say anything that is not substantiated by data.

CONVERSATIONAL—This mode allows the chat bot 110 to reply more loosely, based on the instructions it has been given or even using its own general knowledge of the world. For example, one might use this for an instruction like "Reply thanking the user for their time".

VERBATIM—This mode delivers the exact, verbatim respond from the instruction. It does not use AI to generate the response at all. This is useful for situations where one needs to deliver specific wording for legal reasons.

Figures 7A, 7B:
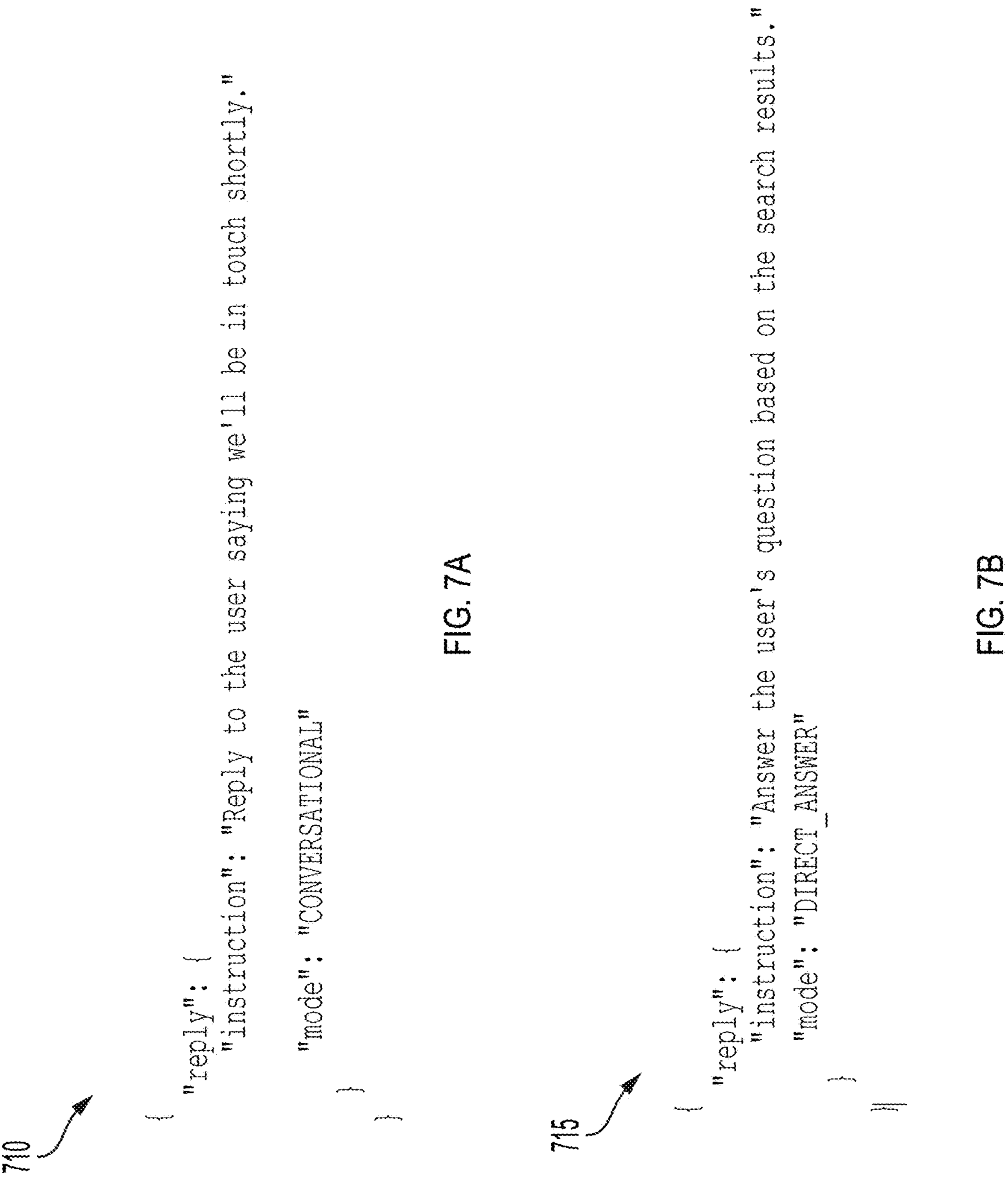
FIG. 7A shows a simple conversational example, according to some embodiments.
FIG. 7B shows a direct answer example, according to some embodiments.

A simple conversational example 710 is shown in FIG. 7A, according to some embodiments. A direct answer example 715 is shown in FIG. 7B, according to some embodiments.

The system 100 may, in some embodiments, include a number of components, each of which may be implemented on a server or on an end-user device. In some cases, a subset of the components may execute on a user device (e.g., a mobile application on a cell phone, a webpage running within a web browser, a local application executing on a personal computer, etc.) and another subset of the components may execute on a server (a physical machine, virtual machine, or container, etc., which may be located at a datacenter, a cloud computing provider, a local area network, etc.).

In some embodiments, a search step uses a search engine to look up relevant information from a Knowledge Graph. This may be used for a variety of different applications, including but not limited to looking up documentation and/or help articles, looking up relevant products based on attributes or user preferences, looking up physical locations (stores, hospitals, bank branches, etc.), and looking up people (doctors, financial advisors, insurance agents, etc.).

In some embodiments, search steps are commonly used in conjunction with DIRECT_ANSWER reply steps to faithfully respond to users' questions using Knowledge Graph data. This may answer questions like:

When is your 43rd street location open?

Do you have any vegan items on the menu?

What's your return policy?

What running shoes do you offer?

Why can't I install your Javascript Library?

How does your product integrate with Microsoft?

In some embodiments, the search tool also has additional configurable options. These include, but are not limited to:

included/excludedVerticals—allows restriction of the verticals of the search experience that the chat bot 110 will consider.

included/excludedFields—allows restriction of the fields of each entity returned from search that the chat bot 110 will consider in its response.

An example 720 of a search step is shown in FIG. 7C, according to some embodiments.

In some embodiments, collect steps are used to solicit information from the user. This collected data may be used later on in another step. This can be useful for asking the user 120 for various data, including but not limited to their name, email, phone number, or other personal information, or an order number, confirmation ID, etc. in order to look up details, or to choose between one of several options and later trigger conditional logic.

Each collect step may require specifying the fields that the chat bot 110 should collect. For each field, the following properties are defined in some embodiments:

ID—each field needs a unique ID. This ID may be referenced in later steps and used in REST API calls or serverless functions.

Type—the data type of the field. Valid data types include, but are not limited to, STRING NUMBER, BOOLEAN, ENUM, EMAIL, and PHONE.

Optional-whether the field is optional. If the field is optional, the chat bot 110 will move on to the next step even if the user 120 hasn't provided it. In some embodiments, a collect step needs at least one non-optional field.

Description-a natural language description of the field. This helps the chat bot 110 understand what the field is and how to ask for it. The chat bot 110 also uses this description in parsing the conversation to extract data.

Given these fields, the chat bot 110 will recursively prompt the user 120 for the data until it finds that the user 120 has given all the data the step requires.

An example 725 of a collect step is shown in FIG. 7D, according to some embodiments.

In some embodiments, a REST API step may be used to read or write data from a REST API, often using data collected from previous steps (though not always). In some embodiments, a REST API step requires the following configuration:

Method—the HTTP verb, either GET, POST, PUT, PATCH or DELETE.

URL—the URL of the API.

Headers—(optional) HTTP headers for the request.

Body—(optional) JSON body for a POST request.

In some embodiments, data collected from previous steps may be used in the URL, headers, or body of a REST API request. For example, one may want to collect the user's city of residence and then send an API request looking up the weather in that city. This can be done by referencing collected data in either the URL, parameters, or body of the request like so: collectedData.theFieldId, where theFieldId is the unique ID of a field collected in a previous collect step.

FIG. 7E shows an end-to-end example 730 that combines a collect, a REST API, and a reply step, according to some embodiments. In this example, the weather in a given city is looked up by first collecting the name of the city as the city field, then sending it to the Open Weather API by referencing the collected data via the syntax: collectedData.city.

In some embodiments, function steps give the chat bot 110 access to user-defined serverless Typescript functions. This allows the chat bot 110 to perform complex tasks including but not limited to transforming, reading, and writing data to external APIs, using open source libraries to manipulate or analyze data, and performing complex business logic. The function may have access to the full history of the conversation, including any collected data, as well as any additional context data that has been provided. Additionally, in some embodiments the return value of the function is saved into the queryResult, so the chat bot 110 can use it to answer questions.

To use a function in an instruction, the pluginId (a plugin is a collection of functions) and the functionName may be specified. An example 735 of a function is shown in FIG. 7F, according to some embodiments.

Figure 7G-1:
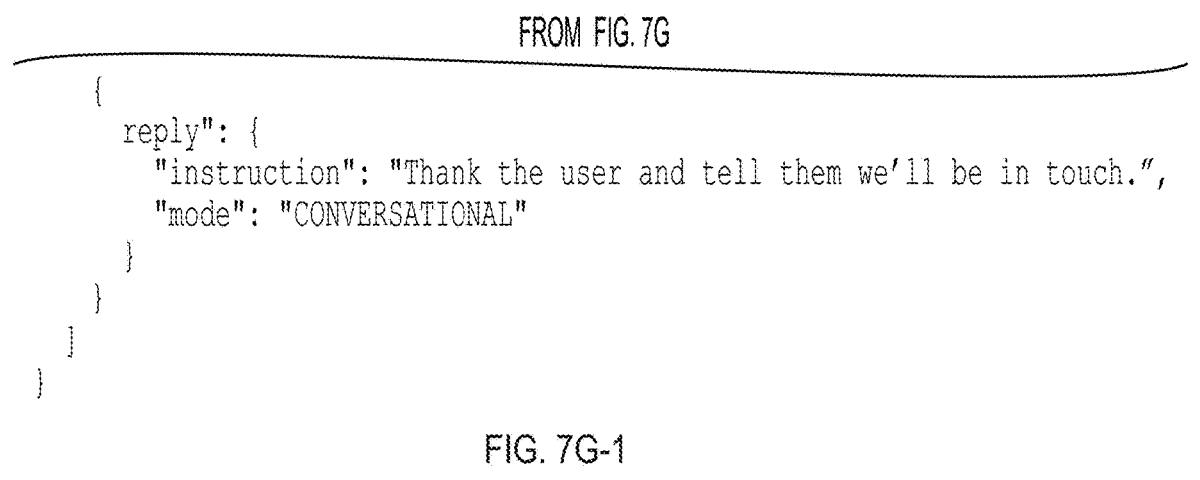

In some embodiments, the chat bot 110 may perform conditional or branching logic. This may be accomplished with an IF step, where the model evaluates a user-defined condition. If the condition is true, the chat bot 110 starts executing a nested series of steps. An example 740 of an IF step is shown in FIG. 7G, according to some embodiments.

In some embodiments, if steps may be nested within other if steps. This can be very helpful in composing very complex workflows for the chat bot 110 that combine multiple different nested conditions. An example 745 of a nested IF step is shown in FIG. 7H, according to some embodiments.

In the example 745 of FIG. 7H, the chat bot 110 asks the user 120 for their email. If it's a personal email, the chat bot 110 asks for their company name. After getting the company name, the chat bot 110 checks if it's a tech company. If it is, the chat bot 110 asks for the user's role within the company. Lastly, the chat bot 110 thanks the user 120 and informs them that they'll be in touch.

It is important to note that a reply step may always terminate the instructions, no matter where it's encountered. This may mean that, once a chat bot 110 has completed a series of nested steps, if it doesn't encounter a reply step, it will move on to the next step outside of the if step.

In the example 740 of FIG. 7G, after the user 120 finishes the "Ask the user for their company name" step, the chat bot 110 moves outside of the conditional step and onto the next step. In other words, it moves from step 2.1 to step 3.

In some embodiments, mutually exclusive conditional steps may be created to ensure that the chat bot 110 only goes down one potential path. This can be achieved by creating multiple successive if statements with mutually exclusive criteria and ensuring that they all contain a reply step.

FIGS. 7I and 7J show an example 750*a*, 750*b* of mutually exclusive conditional steps, according to some embodiments. In this example, the chat bot 110 asks the user 120 what type of insurance they're looking for and performs different, mutually exclusive logic depending on the type. The chat bot 110 first asks the user 120 what type of insurance they're looking for. Depending on the user's response, the chat bot 110 performs a specific set of actions for auto, life, or home insurance, and then concludes with a unique reply message for each type of insurance. Each reply message serves as a termination point for that conditional branch, ensuring that only one set of steps is performed based on the user's initial response.

The components of the system 100 may be implemented in some embodiments as software programs or modules, which are described in more detail below. In other embodiments, some or all of the components may be implemented in hardware, including in one or more signal processing and/or application specific integrated circuits. While the components are shown as separate components, two or more components may be integrated into a single component. Also, while many of the components' functions are described as being performed by one component, the functions may be split among two or more separate components.

In addition, at least one figure conceptually illustrates a process. The specific operations of this process may not be performed in the exact order shown and described. The specific operations may not be performed in one continuous series of operations, and different specific operations may be performed in different embodiments. Furthermore, the process could be implemented using several sub-processes, or as part of a larger macro process.

Other aspects of the invention may relate to generating content to respond to customer reviews. Embodiments may include one or more of the following features:

The ability to customize instructions which will be used to generate review responses, including support for leveraging embedded fields within the instructions for generating responses contextualized to specific entities.

The ability to click a button which generates a response from within the existing response workflow.

In some embodiments, the account settings for configuring a prompt may include, but are not limited to:

1. Respond in the same language as the review,
2. Acknowledge the author by name,
3. Address any negative experiences the customer had, and
4. For negative reviews, invite the customer to reach out (e.g., to a predefined email address) for more assistance.

Figure 8:
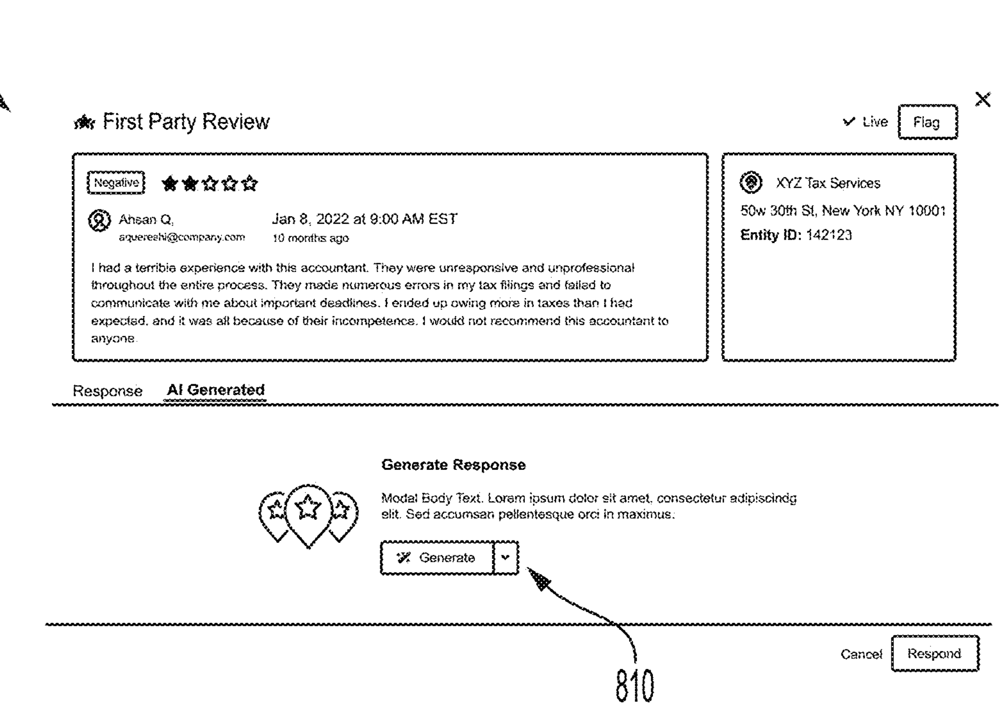
FIG. 8 shows an example of a generate response button embedded within a modal.

In some embodiments, a generate response button may be shown embedded within a response modal. FIG. 8 shows an example of a generate response button 810 embedded within a modal 800.

In some embodiments, some of the key metrics that are tracked to evaluate success are changes in Response Time, Response Rate and revenue earned from selling the Review Response SKU (Separate from the Content Gen SKU). Which generations are actually used in responses are also tracked, to help guide improvement of the prompts and development of in-house models.

Model selection varies in some embodiments, including but not limited to commercially available models (e.g., gpt-3.5-turbp, OpenAI, San Francisco CA), or in-house models trained on specific businesses. An example of a request sent from a Knowledge Graph to a model through DSG is using this Snowflake query:

select * from PROD_PLATFORM_LOCAL.DSP.MODEL_REQUESTS where model_endpoint_id= 'chatCompletions';

In some embodiments, the model may return multiple 'choices' of responses. The system may default to using the first choice returned.

In some embodiments, two components of a prompt may be sent to the model (e.g., via DSG) in order to generate responses. Examples of these components are shown in Table 1.

TABLE 1

| Component | Description | Example |
|---|---|---|
| Hardcoded Prompt | Included in all requests to generate responses, this section includes basic instructions that we want to apply to all requests such as: Information about the Review (Rating, Content Review Author) General instructions, such as a rule to not offer any refunds of promises. The content in blue will vary based on the entity being used, as well as the review data. | You are a helpful assistant who suggests responses to online reviews for {{Entity Name}}, an {{Entity Category}}. When suggesting a response, follow these rules: Rules: Do not offer any refunds, promises, or commitments. Follow the additional instructions provided below Author: {{Review Author}} Review: {{Review Content}} Rating: {{Review Rating}}/5 Additional Instructions: |
| Words in User Instructions | Instructions provided by the customer, which can be configured in Settings. Things a user might put in here are: Brand guidelines for how to response Instructions for limiting the length of responses Embedded entity information | 1. Address the author by name 2. Address any negative experience in the review 3. Limit the response to 4 sentences 4. If the review is less than 3 stars, offer the review a chance to reach out to {{entity.primaryEmail}} for more help |

With this approach, there may be some additional considerations:

In some cases, users may not be permitted to modify the Hardcoded Prompt. In addition, user instructions are not necessarily required to generate responses. Furthermore, user instructions are meant to be a catch-all for custom logic that people want to implement in their generations. Examples of other post-processing rules may include, but are not limited to:

A limit for number of sentences

An option to add an explicit sign-off

An option to select a handful of reviews which can be used for few-shot prompting In some embodiments, every time a response is generated, additional data may be logged. Examples of data are shown in Table 2.

TABLE 2

| Column | Description |
|---|---|
| MODEL_REQUEST_ID | Unique ID for the request sent to DSG. Corresponds to PROD_PLATFORM_LOCAL.DSP.MODEL_REQUESTS.MODEL_REQUEST_ID |
| BUSINESS_ID | Business ID |
| PRINCIPAL_ID | Principal ID who generated the response |
| REVIEW_ID | Review ID |
| TIMESTAMP | Timestamp the response was generated |

In some embodiments, this logging is not in real time. This information may be used for comparing the generated content with the content that is actually published. The comparison may be performed with various methods, for example being calculated with fuzzy string comparison. The information may also be used for seeing how many times a user generates a new response for the same review. In some embodiments, once a response is generated, the user may have the option to change and modify the response.

As used in this specification, the terms "computer," "server," "processor," and "memory" all refer to electronic or other technological devices. These terms exclude people or groups of people. As used in this specification, the terms "computer readable medium," "computer readable media," and "machine readable medium," etc. are entirely restricted to tangible, physical objects that store information in a form that is readable by a computer. These terms exclude any wireless signals, wired download signals, and any other ephemeral signals.

The term "computer" is intended to have a broad meaning that may be used in computing devices such as, e.g., but not limited to, standalone or client or server devices. The computer may be, e.g., (but not limited to) a personal computer (PC) system running an operating system such as, e.g., (but not limited to) MICROSOFT® WINDOWS® available from MICROSOFT® Corporation of Redmond, Wash., U.S.A. or an Apple computer executing MAC® OS from Apple® of Cupertino, Calif., U.S.A. However, the invention is not limited to these platforms. Instead, the invention may be implemented on any appropriate computer system running any appropriate operating system. In one illustrative embodiment, the present invention may be implemented on a computer system operating as discussed herein. The computer system may include, e.g., but is not limited to, a main memory, random access memory (RAM), and a secondary memory, etc. Main memory, random access memory (RAM), and a secondary memory, etc., may be a computer-readable medium that may be configured to store instructions configured to implement one or more embodiments and may comprise a random-access memory (RAM) that may include RAM devices, such as Dynamic RAM (DRAM) devices, flash memory devices, Static RAM (SRAM) devices, etc.

The memory may include, for example, (but not limited to) a hard disk drive and/or a removable storage drive, representing a floppy diskette drive, a magnetic tape drive, an optical disk drive, a read-only compact disk (CD-ROM), digital versatile discs (DVDs), flash memory (e.g., SD cards, mini-SD cards, micro-SD cards, etc.), read-only and recordable Blu-Ray® discs, etc. The removable storage drive may, e.g., but is not limited to, read from and/or write to a removable storage unit in a well-known manner. The removable storage unit, also called a program storage device or a computer program product, may represent, e.g., but is not limited to, a floppy disk, magnetic tape, optical disk, compact disk, etc. which may be read from and written to the removable storage drive. As will be appreciated, the removable storage unit may include a computer usable storage medium having stored therein computer software and/or data.

In some embodiments, the memory may include other similar devices for allowing computer programs or other instructions to be loaded into the computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units and interfaces, which may allow software and data to be transferred from the removable storage unit to the computer system.

Some embodiments include electronic components, such as microprocessors, storage and memory that store computer program instructions in a machine-readable or computer-readable medium (alternatively referred to as computer-readable storage media, machine-readable media, or machine-readable storage media). The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

The computer may also include an input device may include any mechanism or combination of mechanisms that may permit information to be input into the computer system from, e.g., a user. The input device may include logic configured to receive information for the computer system from, e.g., a user. Examples of the input device may include, e.g., but not limited to, a mouse, pen-based pointing device, or other pointing device such as a digitizer, a touch sensitive display device, and/or a keyboard or other data entry device (none of which are labeled). Other input devices may include, e.g., but not limited to, a biometric input device, a video source, an audio source, a microphone, a web cam, a video camera, and/or another camera. The input device may communicate with a processor either wired or wirelessly.

The computer may also include output devices which may include any mechanism or combination of mechanisms that may output information from a computer system. An output device may include logic configured to output information from the computer system. Embodiments of output device may include, e.g., but not limited to, display, and display interface, including displays, printers, speakers, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), etc. The computer may include input/output (I/O) devices such as, e.g., (but not limited to) communications interface, cable and communications path, etc. These devices may include, e.g., but are not limited to, a network interface card, and/or modems. The output device may communicate with processor either wired or wirelessly. A communications interface may allow software and data to be transferred between the computer system and external devices.

The term "processor" is intended to have a broad meaning that includes one or more processors, such as, e.g., but not limited to, that are connected to a communication infrastructure (e.g., but not limited to, a communications bus, cross-over bar, interconnect, or network, etc.). The term processor may include any type of processor, data processor, microprocessor, and/or processing logic that may interpret and execute instructions, including application-specific integrated circuits (ASICs) and field-programmable gate arrays (FPGAs). The processor may comprise a single device (e.g., for example, a single core) and/or a group of devices (e.g., multi-core). The processor may include logic configured to execute computer-executable instructions configured to implement one or more embodiments. The instructions may reside in main memory or secondary memory. The processor may also include multiple independent cores, such as a dual-core processor or a multi-core processor. The processor may also include one or more graphics processing units (GPU) which may be in the form of a dedicated graphics card, an integrated graphics solution, and/or a hybrid graphics solution. Various illustrative software embodiments may be described in terms of this illustrative computer system. After reading this description, it will become apparent to a person skilled in the relevant art(s) how to implement the invention using other computer systems and/or architectures.

The term "storage" is intended to have a broad meaning that includes a removable storage drive, a hard disk installed in hard disk drive, flash memories, removable discs, non-removable discs, etc. In addition, it should be noted that various electromagnetic radiation, such as wireless communication, electrical communication carried over an electrically conductive wire (e.g., but not limited to twisted pair, CAT5, etc.) or an optical medium (e.g., but not limited to, optical fiber) and the like may be encoded to carry computer-executable instructions and/or computer data that embodiments of the invention on e.g., a communication network. These computer program products may provide software to the computer system. It should be noted that a computer-readable medium that comprises computer-executable instructions for execution in a processor may be configured to store various embodiments of the present invention.

The term "network" is intended to include any communication network, including a local area network ("LAN"), a wide area network ("WAN"), an Intranet, or a network of networks, such as the Internet.

The term "software" is meant to include firmware residing in read-only memory or applications stored in magnetic or optical storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

The embodiments illustrated and discussed in this specification are intended only to teach those skilled in the art how to make and use the invention. In describing embodiments of the invention, specific terminology is employed for the sake of clarity. However, the invention is not intended to be limited to the specific terminology so selected. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described. For example, it is to be understood that the present disclosure contemplates that, to the extent possible, one or more features of any embodiment can be combined with one or more features of any other embodiment.

We claim:

1. A method for a chat bot, comprising:

receiving a plurality of instruction sets corresponding to a plurality of goals, each instruction set in said plurality of instruction sets defining a prompt to a large language model to achieve a corresponding goal in said plurality of goals;

receiving a chat history from a user, said chat history comprising a plurality of messages, each message in said plurality of messages being one of a user-authored message or a chat bot-authored message, and said chat history further comprising metadata associated with said chat history, wherein the chat history and the metadata are included in each request to a stateless application programming interface (API), such that a state of a chat is maintained by a user client and not persisted by the stateless API, wherein the user stores the chat history and the metadata and transmits the chat history and the metadata to the stateless API in each request;

identifying, based on the chat history and said plurality of goals, a particular goal of said user from said plurality of goals;

selecting a particular instruction set from said plurality of instruction sets based on said particular goal, said particular instruction set defining a particular prompt to said large language model, wherein said particular prompt is a first prompt, and wherein said metadata comprises said particular goal, a first index identifying a previously executed instruction in said particular instruction set, and a second index corresponding to a message in said plurality of messages;

executing said particular instruction set by providing said particular prompt to said large language model, wherein executing said particular instruction set further comprises:

based on said first index, selecting a particular instruction from said particular instruction set;

executing said particular instruction;

updating said first index in said metadata to identify said particular instruction;

defining a second prompt to said large language model, said second prompt comprising said particular instruction and said chat history; and providing said second prompt to said large language model; and providing a reply to said user with a result of executing said particular instruction set.

2. The method of claim 1, wherein said particular instruction includes one of requesting information relevant to said particular goal from said user and generating a query to an external database for data relevant to said particular goal.

3. The method of claim 1, wherein determining the particular goal comprises determining that said metadata comprises an identifier for the particular goal.

4. The method of claim 1, wherein said particular prompt is a first prompt, and determining the particular goal comprises:

defining a second prompt to said large language model, said second prompt comprising said chat history and said plurality of goals;

providing said second prompt to said large language model;

receiving an output from said large language model, said output comprising said particular goal; and updating said metadata to include said particular goal.

5. The method of claim 1, wherein said particular prompt comprises instructions for collecting information relevant to said particular goal from the user, by generating a user prompt, providing said user prompt to said user, and receiving a reply from said user in response to said user prompt, wherein said reply comprises said information.

6. The method of claim 5, wherein said particular prompt comprises instructions for performing a call to an application programming interface, wherein said call comprises said information relevant to said particular goal received from said user.

7. The method of claim 5, wherein said particular prompt comprises instructions for performing a function call, wherein said function call comprises said information relevant to said particular goal received from said user.

8. The method of claim 5, further comprising updating said metadata to include said information.

9. The method of claim 1, wherein said particular prompt comprises instructions for generating a query to an external database for data relevant to said particular goal, providing said query to said external database, and receiving a response from said external database, wherein said response comprises said data.

10. The method of claim 9, wherein said particular prompt comprises instructions for performing a call to an application programming interface, wherein said call comprises said data relevant to said particular goal received from said external database.

11. The method of claim 9, wherein said particular prompt comprises instructions for performing a function call, wherein said function call comprises said data relevant to said particular goal received from said external database.

12. The method of claim 9, further comprising updating said metadata to include said data.

13. The method of claim 1, wherein said particular prompt comprises conditional logic to execute a subset of instructions in said particular instruction set.

14. A non-transitory computer-readable medium storing a set of instructions for a chat bot, which when executed by a computer, configure the computer to:

receive a plurality of instruction sets corresponding to a plurality of goals, each instruction set in said plurality of instruction sets defining a prompt to a large language model to achieve a corresponding goal in said plurality of goals;

receive a chat history from a user, said chat history comprising a plurality of messages, each message in said plurality of messages being one of a user-authored message or a chat bot-authored message, and said chat history further comprising metadata associated with said chat history, wherein the chat history and the metadata are included in each request to a stateless application programming interface (API), such that a state of a chat is maintained by a user client and not persisted by the stateless API, wherein the user stores the chat history and the metadata and transmits the chat history and the metadata to the stateless API in each request;

identify, based on the chat history and said plurality of goals, a particular goal of said user from said plurality of goals;

select a particular instruction set from said plurality of instruction sets based on said particular goal, said particular instruction set defining a particular prompt to said large language model, wherein said particular prompt is a first prompt, and wherein said metadata comprises said particular goal, a first index identifying a previously executed instruction in said particular instruction set, and a second index corresponding to a message in said plurality of messages;

execute said particular instruction set by providing said particular prompt to said large language model, wherein executing said particular instruction set further comprises:

based on said first index, selecting a particular instruction from said particular instruction set;

executing said particular instruction;

updating said first index in said metadata to identify said particular instruction;

defining a second prompt to said large language model, said second prompt comprising said particular instruction and said chat history; and providing said second prompt to said large language model; and provide a reply to said user with a result of executing said particular instruction set.

15. The non-transitory computer-readable medium of claim 14, wherein said particular instruction includes one of requesting information relevant to said particular goal from said user, and generating a query to an external database for data relevant to said particular goal.

16. The non-transitory computer-readable medium of claim 14, wherein determining the particular goal comprises determining that said metadata comprises an identifier for the particular goal.

17. The non-transitory computer-readable medium of claim 14, wherein said particular prompt is a first prompt, and determining the particular goal comprises:

defining a second prompt to said large language model, said second prompt comprising said chat history and said plurality of goals;

providing said second prompt to said large language model;

receiving an output from said large language model, said output comprising said particular goal; and updating said metadata to include said particular goal.

18. The non-transitory computer-readable medium of claim 14, wherein said particular prompt comprises instructions for collecting information relevant to said particular goal from the user, by generating a user prompt, providing said user prompt to said user, and receiving a reply from said user in response to said user prompt, wherein said reply comprises said information.

19. The non-transitory computer-readable medium of claim 18, wherein said particular prompt comprises instructions for performing a call to an application programming interface, wherein said call comprises said information relevant to said particular goal received from said user.

20. The non-transitory computer-readable medium of claim 18, wherein said particular prompt comprises instructions for performing a function call, wherein said function call comprises said information relevant to said particular goal received from said user.

21. The non-transitory computer-readable medium of claim 18, further comprising updating said metadata to include said information.

22. The non-transitory computer-readable medium of claim 14, wherein said particular prompt comprises instructions for generating a query to an external database for data relevant to said particular goal, providing said query to said external database, and receiving a response from said external database, wherein said response comprises said data.

23. The non-transitory computer-readable medium of claim 22, wherein said particular prompt comprises instructions for performing a call to an application programming interface, wherein said call comprises said data relevant to said particular goal received from said external database.

24. The non-transitory computer-readable medium of claim 22, wherein said particular prompt comprises instructions for performing a function call, wherein said function call comprises said data relevant to said particular goal received from said external database.

25. The non-transitory computer-readable medium of claim 22, wherein the instructions, when executed by the computer, further configure the computer to update said metadata to include said data.

26. The non-transitory computer-readable medium of claim 14, wherein said particular prompt comprises conditional logic to execute a subset of instructions in said particular instruction set.

* * * * *